United States Patent
Lafleur

(10) Patent No.: US 11,277,952 B2
(45) Date of Patent: Mar. 22, 2022

(54) WEED REMOVER

(71) Applicant: ANDRE LAFLEUR RD & D INC., Boucherville (CA)

(72) Inventor: Andre Lafleur, Boucherville (CA)

(73) Assignee: ANDRÉ LAFLEUR RD&D INC., Boucherville (CA)

( * ) Notice: Subject to any disclaimer, the term of this patent is extended or adjusted under 35 U.S.C. 154(b) by 0 days.

(21) Appl. No.: 16/922,605

(22) Filed: Jul. 7, 2020

(65) Prior Publication Data

US 2021/0015020 A1 Jan. 21, 2021

Related U.S. Application Data

(60) Provisional application No. 62/875,200, filed on Jul. 17, 2019.

(51) Int. Cl.
*A01B 1/16* (2006.01)
*E21B 25/04* (2006.01)

(52) U.S. Cl.
CPC .............. *A01B 1/165* (2013.01); *E21B 25/04* (2013.01)

(58) Field of Classification Search
CPC ............ A01B 1/16; A01B 1/165; E21B 25/04
See application file for complete search history.

(56) References Cited

U.S. PATENT DOCUMENTS

| | | | | |
|---|---|---|---|---|
| 2,057,142 A | * | 10/1936 | Fry | A01B 1/165 172/22 |
| 4,715,634 A | * | 12/1987 | Mueller | A01B 1/165 294/50.5 |
| 4,822,088 A | * | 4/1989 | Price | A01B 1/165 294/50 |
| 4,884,638 A | * | 12/1989 | Hoffman | E21B 11/005 172/22 |
| 5,338,078 A | * | 8/1994 | Basek | A01B 1/165 172/22 |
| 5,409,281 A | * | 4/1995 | Price | A01B 1/165 294/50 |
| 5,469,923 A | * | 11/1995 | Visser | A01B 1/165 111/106 |
| 5,685,587 A | * | 11/1997 | Putnam, Jr. | A01B 1/165 294/50.5 |
| 5,836,630 A | * | 11/1998 | Putnam, Jr. | E21B 11/005 294/50.5 |
| 5,865,259 A | * | 2/1999 | Catto | A01B 1/165 172/25 |
| 6,927,720 B2 | * | 8/2005 | Matsumoto | H03M 3/344 341/150 |

(Continued)

*Primary Examiner* — Gary S Hartmann

(74) *Attorney, Agent, or Firm* — Benoit & Cote Inc.; Charles-André Caron

(57) ABSTRACT

A weed remover for removing weeds comprising a tube comprising a main portion and a bottom portion at a distal end which is insertable into soil to capture a core sample thereof. The tube is formed of a static portion and of a moving portion which complements the static portion to form the tube, wherein the tube comprises an inner diameter smaller at the distal end than in the main portion. At the distal end, the moving portion extends over an angular range from about 90° to about 150° and the static portion extends over a complementary angular range to form a contour. The bottom portion is formed of a succession of projections and recesses around the contour to form a cutting edge.

17 Claims, 10 Drawing Sheets

(56) References Cited

U.S. PATENT DOCUMENTS

| | | | |
|---|---|---|---|
| 6,945,332 B2* | 9/2005 | Uehara | A01B 45/023 172/22 |
| 8,479,837 B2 | 7/2013 | Kirchmann | |
| 8,613,326 B2 | 12/2013 | Pare et al. | |
| 2003/0037715 A1 | 2/2003 | Santa Cruz et al. | |
| 2005/0051346 A1* | 3/2005 | Reed | A01B 1/16 172/371 |
| 2008/0105444 A1 | 5/2008 | Lafleur | |

\* cited by examiner

WEED REMOVER

CROSS-REFERENCE TO RELATED APPLICATIONS

This application claims the benefit of U.S. provisional patent application 62/875,200, filed Jul. 17, 2019, the specification of which is hereby incorporated herein by reference in its entirety.

BACKGROUND

(a) Field

The subject matter disclosed generally relates to gardening tools. More specifically, it relates to a weed remover.

(b) Related Prior Art

There are various devices on the market which can be used to remove weed on the lawn, i.e., individual vegetal objects to be removed from a soil surface in which their roots grow downwardly, and typically where the remaining parts of the soil surface contain vegetation not to be removed, such as lawn.

These weed removers already on the market usually have some drawbacks which are worth improving in order to reduce the irritation the users can experience when using them.

Particularly, weed removers which comprise toothed jaws to grip the weed's root are more prone to miss the target weed when they are used, or extract only a portion of the weed. For example, weeds normally have roots which may not be grasped, or the weed remover may grip only a few leaves or a portion of the plant stem, while leaving a remaining portion of the plant stem, roots and other leaves intact. Weed removers which comprise toothed jaws are not very efficient in wet ground. Typically, their manufacturing cost is also high.

Other devices may involve inclined pins which are inserted into the ground. Such devices are hard top operate in a ground that is particularly wet or dry. For example, the actionable pins of such devices can bend or break if the ground is hard.

There is therefore a need for a weed remover which is more robust and more versatile for use in a variety of ground conditions (dry, wet, hard, etc.), while being simple to manufacture.

SUMMARY

According to an embodiment, there is provided a weed remover for removing weeds from a ground, the weed remover comprising: a tube comprising a distal end which is insertable into soil to capture a core sample thereof, the tube being formed of a static portion and of a moving portion which complements the static portion to form the tube, wherein the tube comprises an inner diameter, the inner diameter at the distal end being smaller than the inner diameter proximal from the distal end, and a mechanism to move the moving portion distally from the static portion to release the core sample of soil captured in the tube.

According to an aspect, the mechanism to move the moving portion distally from the static portion comprises a pusher which is actionable by a user with respect to a tool handle, the static portion being static with respect to the tool handle, and the pusher comprising a rod which pushes onto the moving portion distally.

According to an aspect, the mechanism further comprises a spring in relation with the rod and which pulls the moving portion back into a default position when the pusher is not actioned.

According to an aspect, at the distal end, the moving portion extends over an angular range from about 90° to about 150° and the static portion extends over an angular range which is complementary to the angular range of the moving portion to form a 360° contour of the tube at the distal end.

According to an aspect, the tube comprises a main portion and a bottom portion at a distal end of the tube and the bottom portion is formed of a succession of projections and recesses around a contour at the distal end of the tube which forms a cutting edge thereof.

According to an aspect, the bottom portion extends distally and inwardly to reduce a diameter at the distal end in comparison with a top of the bottom portion.

According to an aspect, the main portion has a variable inner diameter which reduces as it extends distally.

According to an embodiment, there is provided a weed remover for removing weeds from a ground, the weed remover comprising: a tube comprising a main portion and a bottom portion at a distal end of the tube which is insertable into soil to capture a core sample thereof, the tube being formed of a static portion and of a moving portion which complements the static portion to form the tube, wherein at the distal end, the moving portion extends over an angular range from about 90° to about 150° and the static portion extends over an angular range which is complementary to the angular range of the moving portion to form a 360° contour of the tube at the distal end, and a mechanism to move the moving portion distally from the static portion to release the core sample of soil captured in the tube.

According to an aspect, the moving portion comprises a mechanical stop secured to the moving portion, the mechanical stop forming a ceiling for the tube.

According to an aspect, the tube comprises a window in the main portion which is distal from the mechanical stop when the moving portion is in a default position.

According to an aspect, the mechanism to move the moving portion distally from the static portion comprises a pusher which is actionable by a user with respect to a tool handle, the static portion being static with respect to the tool handle, and the pusher comprising a rod which pushes onto the moving portion distally.

According to an aspect, the mechanism further comprises a spring in relation with the rod and which pulls the moving portion back into a default position when the pusher is not actioned.

According to an embodiment, there is provided a weed remover for removing weeds from a ground, the weed remover comprising: a tube comprising a main portion and a bottom portion at a distal end of the tube, the tube being formed of a static portion and of a moving portion which complements the static portion to form the tube, wherein the bottom portion is formed of a succession of projections and recesses around a contour at the distal end of the tube which forms a cutting edge thereof.

According to an aspect, both the moving portion and static portion have an edge acting as a cutter onto the ground such that when the tube is pressed onto the ground, it cuts and captures a core sample of soil.

According to an aspect, the succession of projections and recesses around a contour at the distal end of the tube forms a wavy contour of the distal end of the tube.

According to an aspect, the bottom portion extends distally and inwardly to reduce a diameter at the distal end in comparison with a top of the bottom portion.

According to an aspect, the main portion has a variable inner diameter which reduces as it extends distally.

According to an aspect, the tube comprises a window in the main portion.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
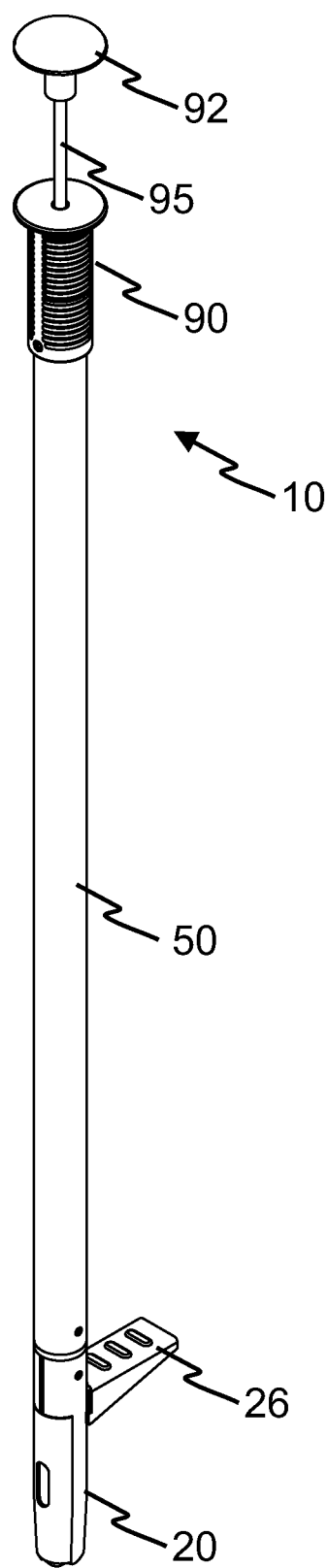
FIG. 1 is a side view illustrating a weed remover, according to an embodiment of the invention.
Figure 11:
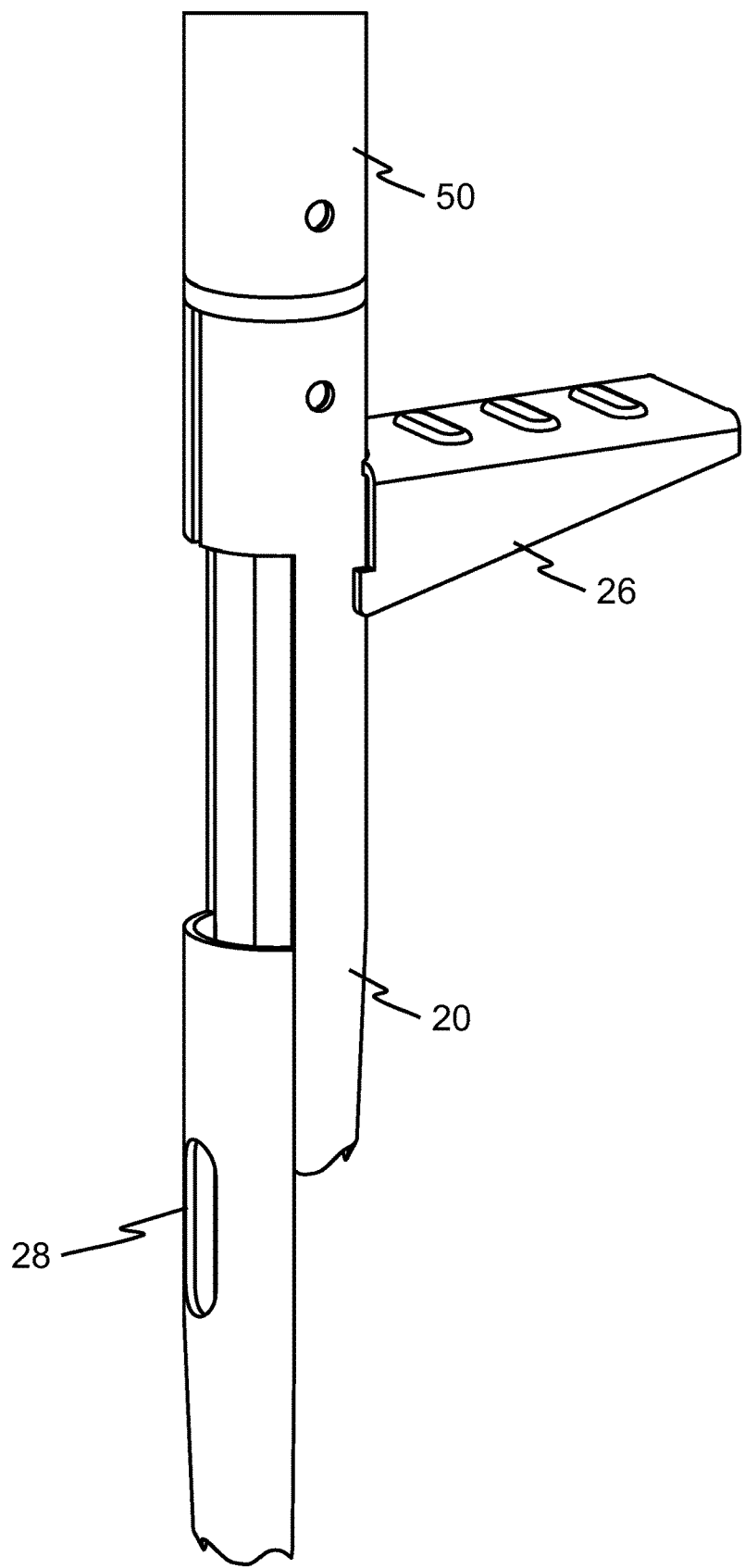
FIG. 11 is a perspective view illustrating a weed remover with the moving portion being positioned distally from the static portion when in use, according to an embodiment of the invention.

Referring to FIG. 1, there is described a weed remover 10, also referred herein as a tool, which removes weed using a cutting tube 20 (or more simply, the tube) that is pressed into the ground, cutting the surface of the ground and getting deeper thereinto to perform coring of the soil, preferably at a location containing the weed's root, the tube 20 thereby capturing a core sample of soil containing the stem and root of the weed (and thereby performing effective removal thereof). After the coring, the distal end of the weed remover 10 is removed from the ground, by having the user pulling it up out of the ground, and the tube 20 is actively opened at its distal end by having a moving portion 30 of the tube urged forwardly using a mechanism that serves as an intermediate between the user and the moving portion 30 (see FIG. 8) for extending it. When actuated, that moving portion 30 of the tube temporarily protrudes distally with respect to the remainder of the tube, as shown in FIG. 11, in a manner which, when that portion is in extension, is similar to a bayonet, to release the core sample that was captured by the tube.

Figure 2:
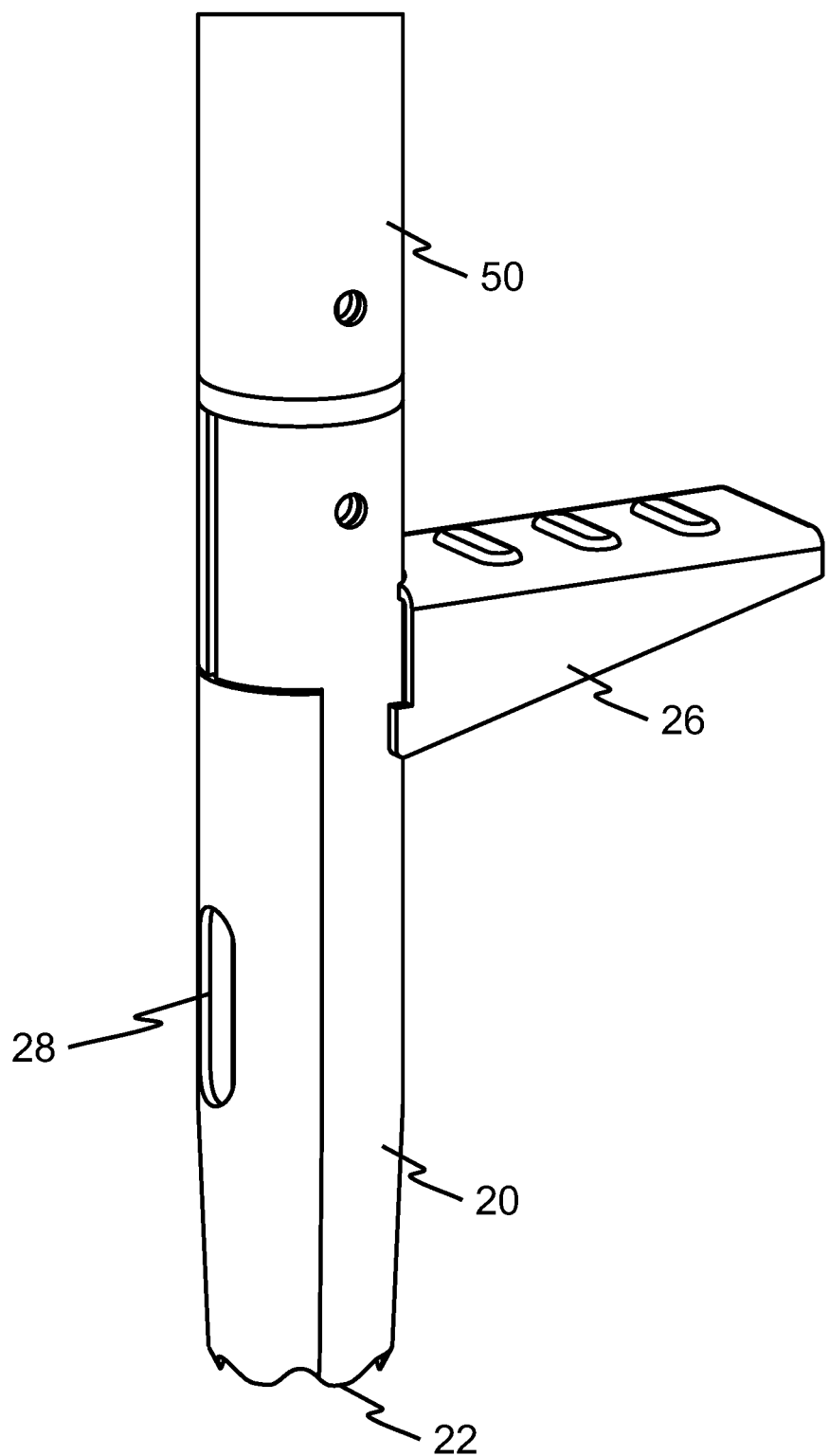
FIG. 2 is a side view illustrating the tube at the distal end of the weed remover, according to an embodiment of the invention.

As mentioned above, the weed remover 10 comprises a hollow, cutting tube 20 at a distal end thereof, as shown in FIG. 2. The distal end is defined as being distal from the handle 90 and the pusher 92, and the purpose of which is to be directed toward the ground for weed removing, distally from the user's hands. The hollow, cutting tube 20 is open at the distal end thereof (hence it is hollow) such that the inside of the hollow tube is accessible from that end, as specifically shown in FIGS. 3-5. From the hollow distal end, soil can enter the tube 20 when the weed remover 10 is pressed onto the ground surface.

The tube 20 defines an edge 22 on the contour of its distal end (distal end of the weed remover 10), within which it is open such as to make the distal end of the tube 20 hollow. The contour has a substantially circular shape when viewed from the bottom, consistent with the cylindrical shape of the tube 20, although other shapes may be appropriate as well (e.g., an ellipse, a polygon, etc.). However, as detailed below, when viewed from the side, the edge 22 may contain projections 61 and recesses 62. The edge 22 is the portion of the weed remover which first enters in contact with the ground and vegetation when the weed remover is applied on the ground and initiates the cutting action.

In order to ease the penetration and continuous downward movement of the cutting tube 20 into the ground, a step 26, secured to the static portion 25 of the tube 20, can be provided to receive pressure from a foot. Pressure can be applied with the user's foot onto the step 26 to apply pressure and force the tube 20 downwardly to perform the coring movement.

Figure 6:
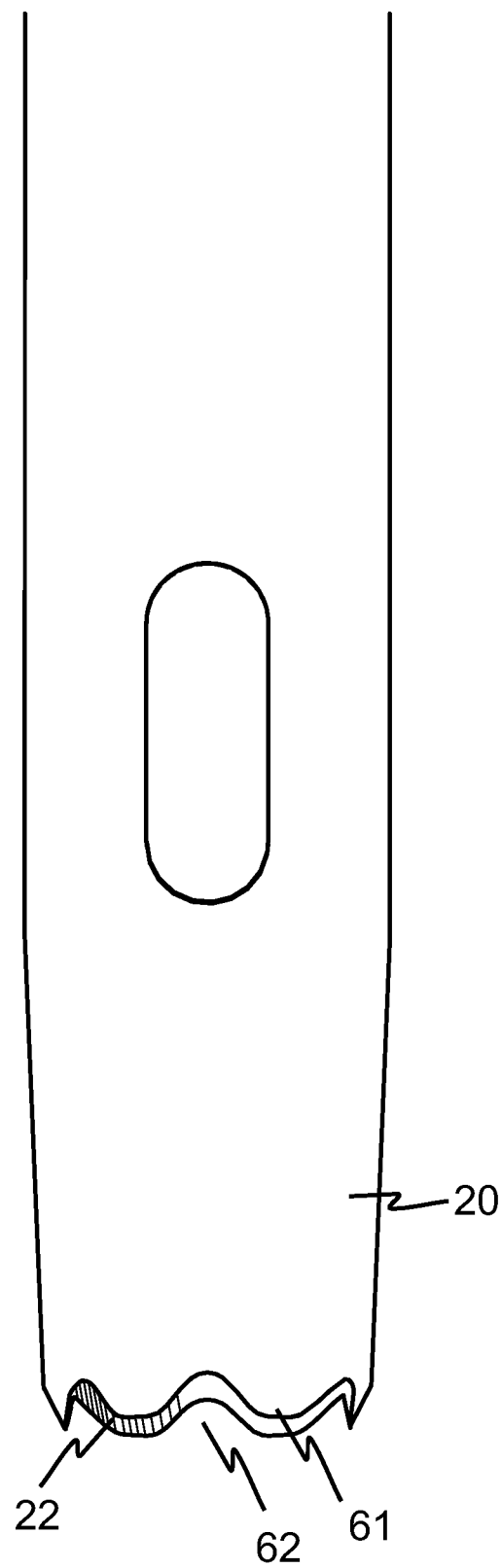
FIG. 6 is a side view illustrating the edge of the tube at the distal end of the weed remover, according to an embodiment of the invention.

According to an embodiment, and as mentioned briefly above, the edge 22 is wavy or toothed, i.e., projections 61 and recesses 62 are present when the tool is viewed from the side, as shown specifically in FIG. 6. The projections 61 and recesses 62 are provided successively along the contour of the edge 22, providing the wavy (sinusoidal) or toothed overall shape of the distal end of the tube 20. This ensures that when the edge 22 is first put in contact with the ground and the vegetation, only a fraction of the contact surface of the edge 22 is effectively in contact with the ground (i.e., the projections 61 but not the recesses 62), thereby locally increasing the pressure applied by the more protruding parts of the wavy or toothed edge (i.e., by the projections 61), on the ground and vegetation. This provides a progressive cutting effect (hence the edge 22 acts as a cutter with greater performance when contact is made and pressure starts being applied). This is very advantageous to remove weed having leaves close to the ground surface, because the higher pressure exerted when the partial contact is initiated and a force is applied induces a progressive cutting action on the leaves, thus preventing the weed remover from simply pushing the whole weed downwardly along with its leaves, a situation which would defeat the purpose of the tool. Instead, leaves on the ground surface are better cut and the tube 20 cuts the soil and captures a core sample.

The projections 61 and recesses 62 are successive, which means that an alternate succession of projections 61 and recesses 62 are present along a circumference of the contour of the edge 22. Although described as wavy, sinusoidal or toothed, the individual length and height of each projection 61 and recess 62 does not need to be constant for each one of them. The term "length" refers to the length occupied on the contour, while the term "height" refers to how far it extends downwardly. The shape of each projection 61 and recess 62 may be described as a height in function of the length, and may comprise functions such as sinusoidal, elliptical (including portions of a circle), parabolic, hyperbolic, triangular, trapezoidal, step function, etc. The function may also be irregular with the overall result that there are at least two projections and at least two recesses successively provided along the contour of the edge 22.

According to an embodiment, the distal end of the tube is slightly narrower than a remainder of the tube (i.e., the portion of the tube not at the distal end), as shown in FIG. 6 where the contour forming the edge 22 is the narrowest section of the tube 20. This ensures that when the tube 20 is pressed into the ground, the core sample that is captured by the weed remover 10 has a width which is constrained by the contour or edge 22 of the tube 20. Since the circular contour has a slightly smaller diameter than the remainder of the cylindrical tube 20 (i.e., the tube apart from the contour or edge 22), the core sample of soil that is captured into the tube 20 has a width which is slightly smaller than the inner width of the tube. This situation avoids having the core sample of soil being stuck inside the tube, as it remains rather loose inside the tube. This looseness of the captured core sample of soil inside the tube facilitates the eventual release of the core sample.

In other words, the inside diameter (defined between opposing locations of the inner surface) of the contour or edge 22 is smaller than the inside diameter of the tube 20 in the main portion thereof, above the bottom portion comprising the contour or edge 22. The difference in inside diameter needs to be significant enough to be measurable and apparent but does not need to be extreme. As shown in FIG. 6, the inside diameter at the edge 22 is between 2% and 20%, or between 5% and 15%, or about 10% smaller than the inside diameter inside the main portion of the tube 20.

According to an embodiment, and as shown in FIG. 2, the tube 20 can comprise a bottom portion having a truncated cone shape forming the bottom portion, which makes the link between the narrower contour at the edge 22 and the purely cylindrical portion of the tube 20 forming the main portion of the tube 20 just above said bottom portion, with a linearly decreasing diameter. In another example, the junction between the main portion of the tube 20 and the bottom portion comprising the contour or edge 22 may be tapered, with a non-linearly decreasing diameter. Other functions describing the reduction in diameter may be appropriate (such as a step function, with sudden reduction in diameter), According to an embodiment, the bottom portion of the tube 20 which has a narrower or narrowing diameter below the main portion of the tube 20 (which has a constant diameter larger than in the bottom portion and especially larger than at the contour or edge 22) is integral with a remainder of the tube 20, i.e., these are not separate parts and it is the tube 20 itself which reduces in inside diameter at the bottom thereof. In another embodiment, these are separate parts joined together firmly, for example by soldering, bolting, screwing and other securing means.

According to an embodiment, and as shown in FIG. 6, the junction between the bottom portion and the main portion of the tube is defined at the maximum top height reached by any one of the recesses 62.

As shown in FIG. 6, the main portion of the tube 20, above the bottom portion, may also have an inside diameter which varies along the height thereof, for example linearly decreasing as it gets closer to the bottom portion.

Figure 3:
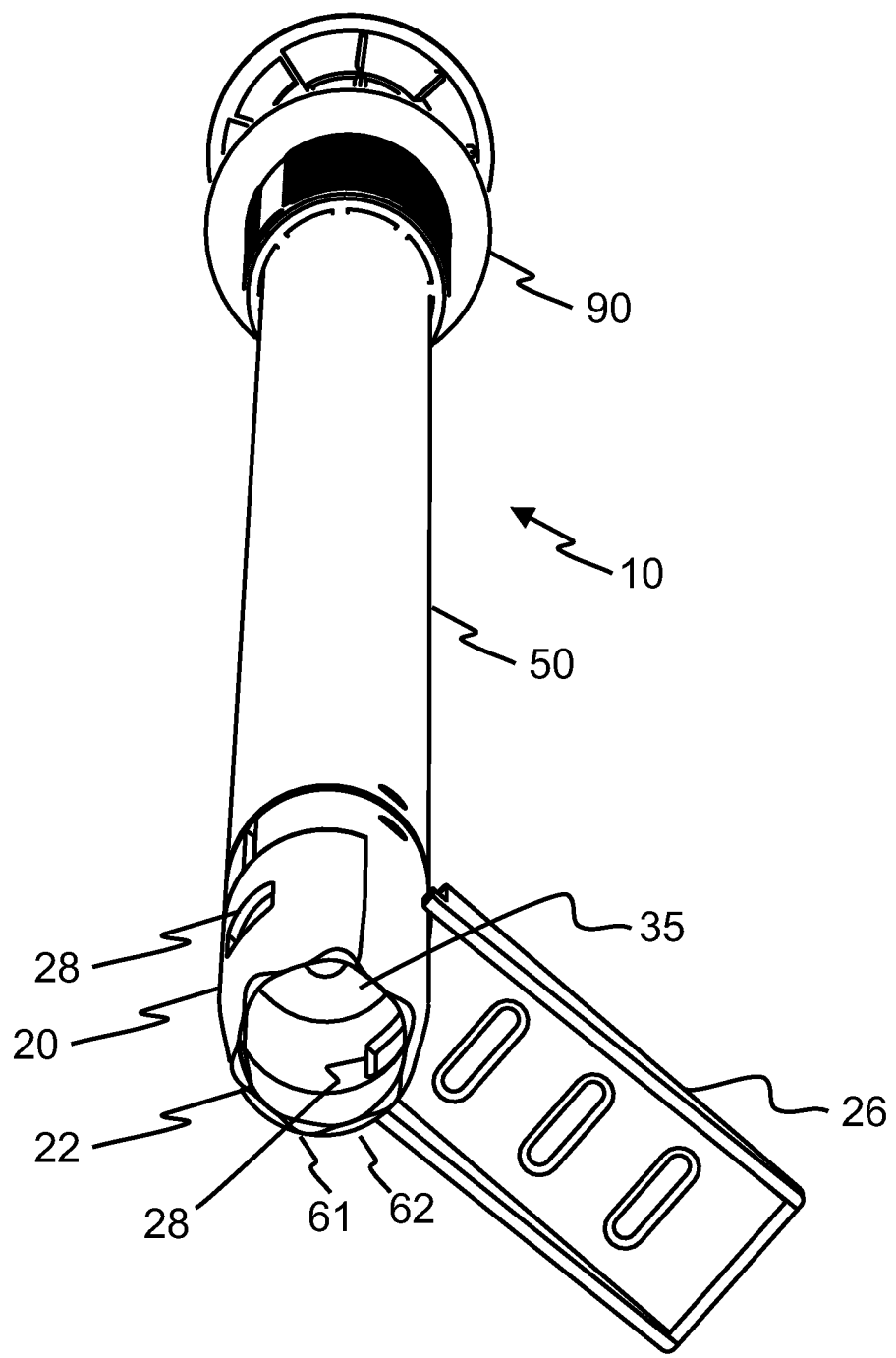
FIG. 3 is a bottom perspective view illustrating the tube at the distal end of the weed remover, according to an embodiment of the invention.
Figure 4:
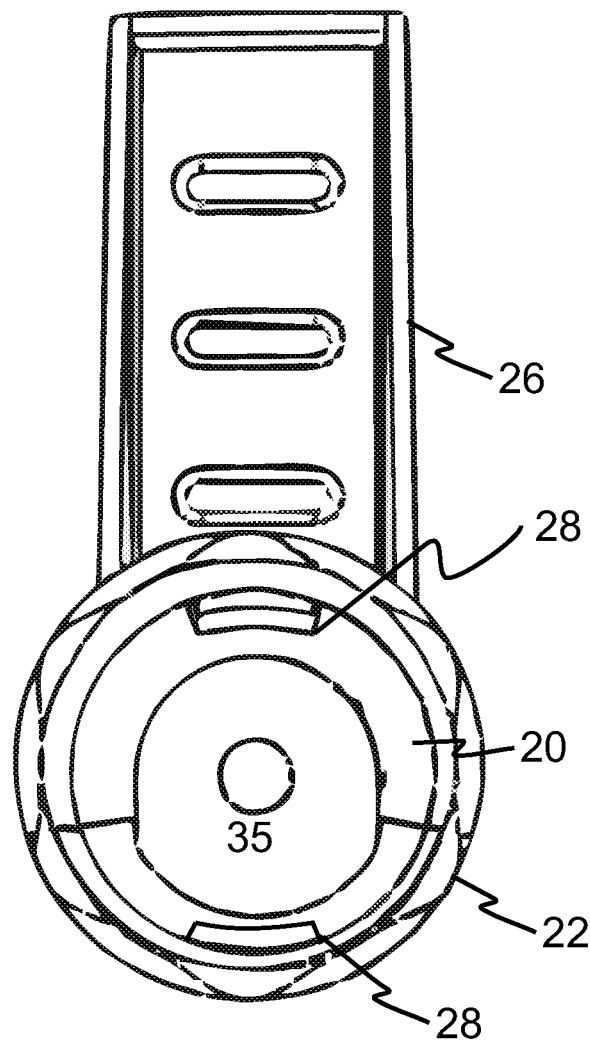
FIG. 4 is a bottom view illustrating the tube at the distal end of the weed remover, according to an embodiment of the invention.
Figure 5:
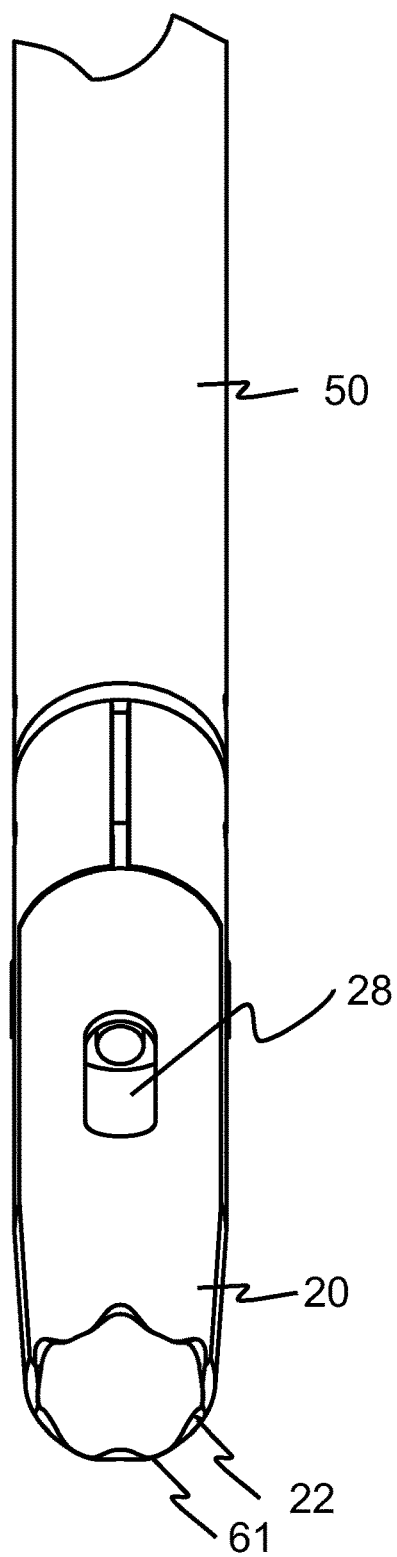
FIG. 5 is another bottom perspective view illustrating the tube at the distal end of the weed remover, according to an embodiment of the invention.

According to an embodiment, a window 28 can be provided on the tube 20, again to avoid having the core sample of soil being stuck inside the tube by reducing potential surface contact. The window can be provided on the moving portion 30 of the tube, as well shown in FIGS. 5 and 8, or on the remainder of the tube (i.e., the static portion 25), or both, as shown in FIGS. 3-4. The window 28 is also useful to ease cleaning of the tube 20, and also to reduce the overall weight of the weed remover 10.

To limit the height of the core sampled from the soil (and ease the ejection of the core), there is provided a mechanical stop 35 which is an abutment surface inside the tube, at a proximal end of the inside of the tube 20. The tube 20 is permanently open at its bottom to surround and capture a core sample when pressed into the ground, and the top of the tube is defined by the presence of this mechanical stop 35, acting as a ceiling for the inside of the tube 20. During the coring movement, the tube 20 penetrates the ground, which implies that the top surface of the ground is inside the tube, starting at the bottom (distal end) and getting higher as the coring movement is performed. Once the top surface of the ground has reached the mechanical stop 35, the core sample has been captured down to a presumably acceptable depth in the ground and the downward movement of the weed remover 10 can be stopped.

At this stage, the tube 20 is planted into the ground. It needs to be removed therefrom. Since the distal end of the tube 20 has a cylindrical shape, without teeth or pins, it is advantageously easy to remove from the ground by simply pulling up the weed remover 10. The weed remover 10 will nonetheless contain the captured core sample inside the tube 20.

Figure 7:
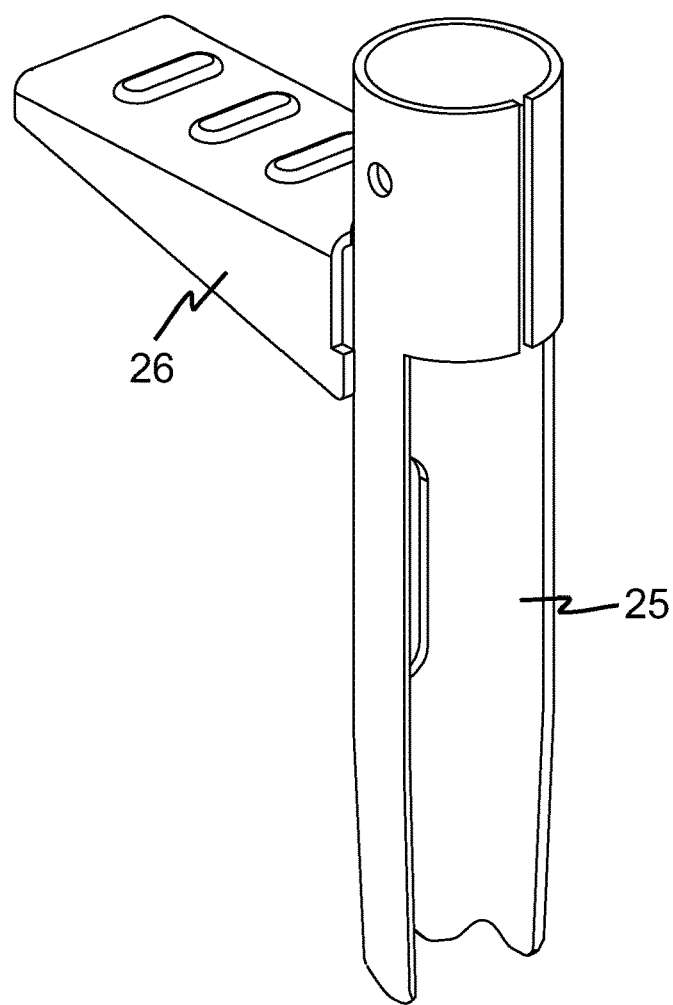
FIG. 7 is a perspective view illustrating the tube of the weed remover without the moving portion thereof, according to an embodiment of the invention.
Figure 8:
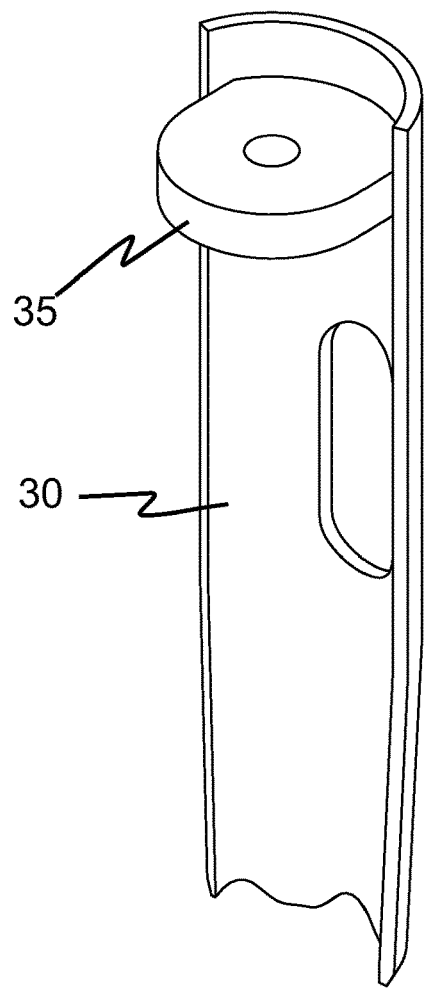
FIG. 8 is a perspective view illustrating the moving portion of the tube of the weed remover, according to an embodiment of the invention.

To release the core sample from the tube 20, a moving portion 30 of the tube, shown in FIG. 8, is made detachable from the remainder of the tube, namely the static portion 25, shown in FIG. 7. The static portion 25 is fixed with respect to the body 50 of the tool. This moving portion 30 of the tube acts like a tongue or blade which can be urged forwardly and thereby protrude distally from the remainder of the tube. The purpose of this moving portion 30 is to push the captured core sample of soil (presumably containing the weed stem and root) forwardly, or distally, to disengage it from the inside of the tube and release it outside of the tool.

To ensure that the protruding portion of the tube actually brings the core sample out of the tube by pushing it, the moving portion 30 of the tube is secured to the mechanical stop 35, or connected such that they move together, as shown in FIG. 8. When the moving portion 30 of the tube is moved in extension, longitudinally in the distal direction, in a manner similar to a blade in a bayonet arrangement, the mechanical stop 35 is also displaced in the same direction and therefore brings the core sample out of the tube by pushing it in the distal direction (i.e., the mechanical stop 35 acting as a ceiling is pushed downwardly to eject the underlying core sample of soil also downwardly). Once a large fraction of the core sample is brought outside the remainder of the tube, i.e., the static portion 25, from the bottom thereof, and considering that a significant side area of the core sample is freed from the larger, static portion 25 of the tube 20 (i.e., the moving portion 30 only has a small angular coverage around the core sample), the core sample will be naturally released from the mechanical stop 35 and the moving portion 30 of the tube. One can expect that it will fall onto the ground or into a container above which it was released.

According to an embodiment, the moving portion 30 has an angular coverage (i.e., it is a thin, curved surface having the shape of an arc of cylinder) which is significant but not more than a half circle (180°). Advantageously, the moving portion 30 has an angular coverage which is approximately a third of a circle (i.e., 120°), or more generally between 25% and 40% of a circle, i.e., a coverage between 90° and approximately 150° which defines the width of the arc of cylinder forming the moving portion 30. The height of the moving portion 30 is defined by the height of the desired core sample, i.e., from the contour or edge 22 to the position of the mechanical stop 35. The static portion 25 should have an angular coverage which complements the coverage of the angular coverage of the moving portion 30 (i.e., it is also an arc of cylinder, typically with larger angular coverage, such as between 270° and approximately 210° to complement the exemplary range of between 90° and approximately 150° of the angular range of the moving portion 30) in order to form a full tube that surrounds the core sample.

Figure 9:
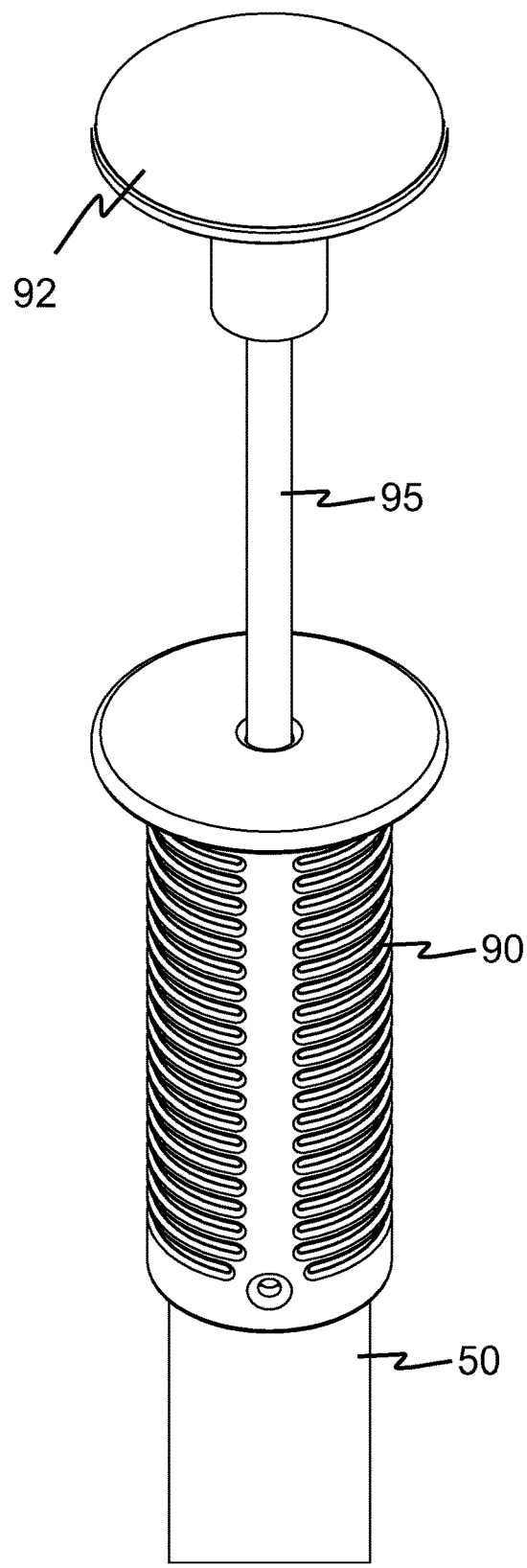
FIG. 9 is a perspective view illustrating the handle and pusher of the weed remover, according to an embodiment of the invention.

In order to slide forwardly the moving portion 30 of the tube to provoke the release, a pusher 92 is provided, as shown in FIG. 9. The pusher can be pushed downwardly into the handle 90, and connects with a rod 95 that extends longitudinally inside the body 50, shown in FIG. 10, to the mechanical stop 35 to which the moving portion 30 of the tube is secured. The user is expected to hold the handle 90 with their other hand, the handle being integrated to the body 50 of the tool to which the static portion 25 of the tube 20 is secured. As a result of the downward movement of the pusher 92, both the mechanical stop 35 and the moving portion 30 of the tube undergo a translation movement in the forward distal direction. The mechanical stop 35 and the moving portion 30 can be provided as a single piece or be two separate pieces fixedly secured together, as long as they move together under the action of the rod 95 which is connected thereto to drive their movement.

Figure 10:
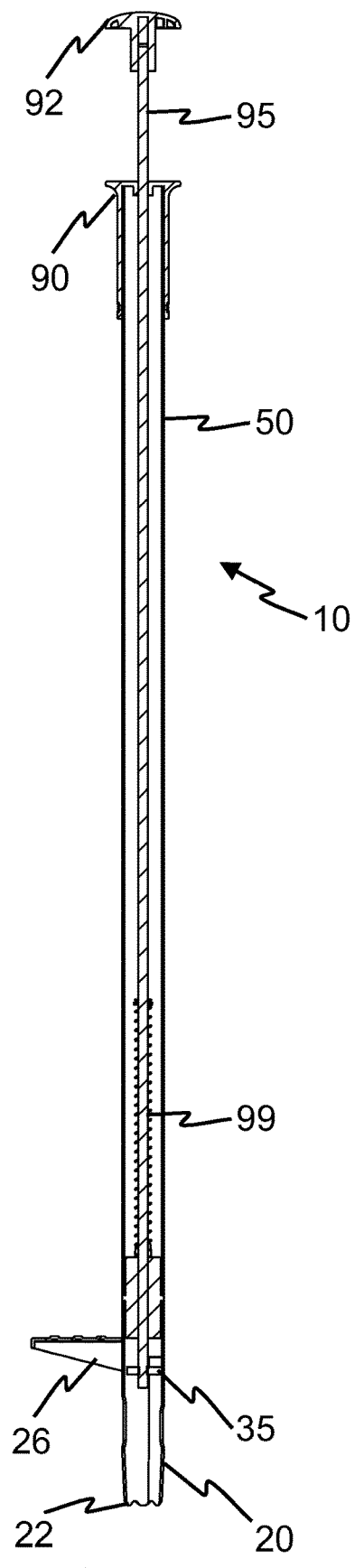
FIG. 10 is a cross section in a longitudinal plane illustrating a weed remover, according to an embodiment of the invention.

According to an embodiment, a spring 99, shown in FIG. 10, can be provided to bring the mechanical stop 35 (and, consequently, the moving portion 30) back up to the default position in which the tube is unbroken and appears to be integral (both the static and moving portions 25, 30 complement each other to form the tube) when the pusher 92 is not actuated as shown in FIGS. 1, 2, 5 and 10.

According to an embodiment, the spring 99 can be provided between the handle of the pusher 92 and the handle 90 of the tool, urging at both ends on these surfaces, and extending around the rod 95.

Regarding the materials for the weed remover 10, aluminum is advantageous as it has a low density and does not rust. However, the tube 20 may be easier to shape and stronger if it is made of steel, galvanized steel, stainless steel. Therefore, the body 50 can be made of aluminum, and the tube 20 can be made of steel.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A weed remover for removing weeds from a ground, the weed remover comprising:
   a tube comprising a distal end which is insertable into soil to capture a core sample thereof, the tube being formed of a static portion and of a moving portion which complements the static portion to form the tube, wherein the distal end of the tube extends inwardly to make an inner diameter of the tube smallest at the distal end of the tube, wherein at the distal end, the moving portion extends over an angular range from about 90° to about 150° and the static portion extends over an angular range which is complementary to the angular range of the moving portion to form a 360° contour of the tube at the distal end, and
   a mechanism to move the moving portion distally from the static portion to release the core sample of soil captured in the tube.

2. The weed remover of claim 1, wherein the mechanism to move the moving portion distally from the static portion comprises a pusher which is actionable by a user with respect to a tool handle, the static portion being static with respect to the tool handle, and the pusher comprising a rod which, in use, pushes onto the moving portion distally.

3. The weed remover of claim 2, wherein the mechanism further comprises a spring in relation with the rod and which, in use, pulls the moving portion back into a default position when the pusher is not actioned.

4. The weed remover of claim 1, wherein the tube comprises a main portion and a bottom portion at a distal end of the tube and the bottom portion is formed of a succession of projections and recesses around a contour at the distal end of the tube which forms a cutting edge thereof.

5. The weed remover of claim 4, wherein the bottom portion extends distally and inwardly to reduce a diameter at the distal end in comparison with a top of the bottom portion.

6. The weed remover of claim 5, wherein the main portion has an inner diameter which decreases as the main portion distally.

7. A weed remover for removing weeds from a ground, the weed remover comprising:
   a tube comprising a main portion and a bottom portion at a distal end of the tube which is insertable into soil to capture a core sample thereof, the tube being formed of a static portion and of a moving portion which complements the static portion to form the tube, wherein at the distal end, the moving portion extends over an angular range from about 90° to about 150° and the static portion extends over an angular range which is complementary to the angular range of the moving portion to form a 360° contour of the tube at the distal end, and
   a mechanism to move the moving portion distally from the static portion to release the core sample of soil captured in the tube.

8. The weed remover of claim 7, wherein the moving portion comprises a mechanical stop secured to the moving portion, the mechanical stop forming a ceiling for the tube.

9. The weed remover of claim 8, wherein the tube comprises a window in the main portion which is distal from the mechanical stop when the moving portion is in a default position.

10. The weed remover of claim 7, wherein the mechanism to move the moving portion distally from the static portion comprises a pusher which is actionable by a user with respect to a tool handle, the static portion being static with respect to the tool handle, and the pusher comprising a rod which, in use, pushes onto the moving portion distally.

11. The weed remover of claim 10, wherein the mechanism further comprises a spring in relation with the rod and which, in use, pulls the moving portion back into a default position when the pusher is not actioned.

12. A weed remover for removing weeds from a ground, the weed remover comprising:
   a tube comprising a main portion and a bottom portion at a distal end of the tube, the tube being formed of a static portion and of a moving portion which complements the static portion to form the tube, wherein at the distal end, the moving portion extends over an angular range from about 90° to about 150° and the static portion extends over an angular range which is complementary to the angular range of the moving portion to form a 360° contour of the tube at the distal end,
   wherein the bottom portion is formed of a succession of projections and recesses around a contour at the distal end of the tube which forms a cutting edge thereof.

13. The weed remover of claim 12, wherein both the moving portion and static portion have an edge acting as a cutter onto the ground such that when the tube is pressed onto the ground, the tube cuts and captures a core sample of soil.

14. The weed remover of claim 13, wherein the succession of projections and recesses around a contour at the distal end of the tube forms a wavy contour of the distal end of the tube.

15. The weed remover of claim 12, wherein the bottom portion extends distally and inwardly, making a diameter smaller at the distal end than at a top of the bottom portion.

16. The weed remover of claim 15, wherein the main portion has an inner diameter which decreases as the main portion extends distally.

17. The weed remover of claim 12, wherein the tube comprises a window in the main portion.

* * * * *